(12) United States Patent
Roth

(10) Patent No.: US 11,248,817 B2
(45) Date of Patent: Feb. 15, 2022

(54) CONTINUOUS MONITORING SYSTEM FOR EARLY FAILURE DETECTION IN HVAC SYSTEMS

(71) Applicant: Roth Technologies, LLC, San Antonio, TX (US)

(72) Inventor: Ronald B. Roth, San Antonio, TX (US)

(73) Assignee: Roth Technologies, LLC, San Antonio, TX (US)

( * ) Notice: Subject to any disclaimer, the term of this patent is extended or adjusted under 35 U.S.C. 154(b) by 0 days.

(21) Appl. No.: 16/672,401

(22) Filed: Nov. 1, 2019

(65) Prior Publication Data

US 2021/0131691 A1    May 6, 2021

(51) Int. Cl.
| | |
|---|---|
| *F24F 11/38* | (2018.01) |
| *G05B 17/02* | (2006.01) |
| *F24F 11/64* | (2018.01) |
| *F24F 11/65* | (2018.01) |
| *F24F 140/60* | (2018.01) |
| *F24F 110/10* | (2018.01) |
| *F24F 140/50* | (2018.01) |

(52) U.S. Cl.
CPC .............. *F24F 11/38* (2018.01); *F24F 11/64* (2018.01); *F24F 11/65* (2018.01); *G05B 17/02* (2013.01); *F24F 2110/10* (2018.01); *F24F 2140/50* (2018.01); *F24F 2140/60* (2018.01)

(58) Field of Classification Search
None
See application file for complete search history.

(56) References Cited

U.S. PATENT DOCUMENTS

| | | | |
|---|---|---|---|
| 4,574,871 A | 3/1986 | Parkinson et al. | |
| 7,966,152 B2 | 6/2011 | Stluka et al. | |
| 9,256,702 B2 | 2/2016 | ElBsat et al. | |
| 10,055,114 B2 | 8/2018 | Shah et al. | |
| 2002/0105429 A1* | 8/2002 | Donner | F16C 19/525 340/682 |
| 2005/0125102 A1 | 6/2005 | Nichols et al. | |
| 2005/0273280 A1* | 12/2005 | Cox | G01R 19/2513 702/60 |
| 2009/0072846 A1* | 3/2009 | Fjerstad | G01R 35/005 324/757.02 |
| 2011/0010509 A1* | 1/2011 | Flores | G06F 7/24 711/154 |
| 2011/0125452 A1* | 5/2011 | Bash | G01K 1/026 702/130 |

(Continued)

OTHER PUBLICATIONS

"Measures of Dispersion", 2020, UC San Diego "http://www.cogsci.ucsd.edu/~nunez/COGS14A_F12/W4.pdf" (Year: 2020).*

(Continued)

*Primary Examiner* — Santosh R Poudel

(57) ABSTRACT

The present disclosure is for a continuous monitoring system for early failure detection in HVAC systems. Specifically, the inventive system monitors input and output temperatures, receives HVAC operation data, and computes Delta T values and other values. With the data that is received and computed, the inventive system computes statistical variance and automatically generates alerts which are transferred remotely.

13 Claims, 11 Drawing Sheets

(56) References Cited

U.S. PATENT DOCUMENTS

| | | | |
|---|---|---|---|
| 2011/0131030 A1* | 6/2011 | McCoy | G01R 31/2801 703/14 |
| 2013/0189702 A1* | 7/2013 | Altmann | C12Q 1/6851 435/6.12 |
| 2014/0236501 A1* | 8/2014 | Mao | G01R 31/343 702/58 |
| 2014/0371917 A1 | 12/2014 | Rite | |
| 2015/0323394 A1 | 11/2015 | Alsaleem | |
| 2017/0039530 A1* | 2/2017 | Natu | G06Q 10/1097 |
| 2017/0060656 A1* | 3/2017 | Bhattacharya | G06F 11/079 |
| 2017/0300046 A1 | 10/2017 | Kerbel et al. | |
| 2017/0336091 A1* | 11/2017 | Arensmeier | G05B 15/02 |
| 2017/0361259 A1 | 12/2017 | Fox et al. | |
| 2018/0068034 A1* | 3/2018 | Zeifman | G05B 19/042 |
| 2018/0195751 A1 | 7/2018 | Bruck et al. | |
| 2019/0234638 A1* | 8/2019 | Song | F24F 11/65 |
| 2019/0258237 A1 | 8/2019 | Buda et al. | |
| 2019/0302709 A1* | 10/2019 | Vitullo | G05B 13/041 |

OTHER PUBLICATIONS

"Sasha Draganov, Detection of outliers in navigation sensor measurements, 2016 IEEE/ION Position, Location and Navigation Symposium (PLANS), Savannah, GA, 2016, pp. 1001-1007, doi: 10.1109/PLANS.2016.747980" (Year: 2016).*

Rosenmai, Peter. Using the Median Absolute Deviation to Find Outliers. Eureka Statistics. <https://eurekastatistics.com>. Accessed Apr. 17, 2021.

* cited by examiner

CONTINUOUS MONITORING SYSTEM FOR EARLY FAILURE DETECTION IN HVAC SYSTEMS

CROSS-REFERENCE TO RELATED APPLICATIONS

None.

BACKGROUND

Field of the Art

This disclosure relates to a continuous monitoring system for early failure detection in HVAC systems.

Discussion of the State of the Art

Heating, Ventilation, and Air Conditioning (HVAC) is the technology of indoor environmental comfort. Its goal is to provide thermal comfort and acceptable indoor air quality. HVAC systems can fail due to a variety of conditions: the unit may freeze, there may be an electric failure, a refrigerant leak, or dirt buildup in the filter. When an HVAC system fails, usually a repair person specially trained in working on HVAC systems is called out to diagnose the issue and repair or replace the system.

One of the challenges with HVAC system failure is that there is no method to alert the user of an impending failure before a portion of the system crashes. Users of HVAC systems do not know the operating status of their HVAC systems. Usually users become aware of an HVAC issue when the unit stops working. It is common that users are unprepared for HVAC system failure and are therefore inconvenienced not only by the failure, but also by the necessary wait time between calling the repair person and the actual repair. In addition, a degraded HVAC system uses more resources (e.g. power) as compared to an HVAC system that is running properly. Identification of a degraded HVAC system allows users to schedule repair in order to save money as well as prevent an HVAC system from shutting down completely.

SUMMARY

The present invention is for a computer program product comprising a non-transitory computer readable storage medium having instructions encoded thereon that, when executed by a processor, cause the processor to receive input and output temperature data, the input data measured by an input temperature sensor placed at the return air plenum of an HVAC unit, and the output temperature data measured by an output temperature sensor placed at the air supply air plenum of the HVAC system, the input and output temperature data received periodically throughout an analysis period, receive HVAC operation data, the operation data measured by a current probe that is connected to the HVAC system, the HVAC operation data received periodically throughout an analysis period, compute Delta T values, run time values, and on/off cycle values from the received input and output temperature data and the received HVAC operation data, the computation performed on data that is periodically received throughout an analysis period, compute statistical variance in the Delta T value, compute upper and lower Delta T limits based on the computed statistical variance in the Delta T value, and automatically generate an alert if the computed upper or lower Delta T limit is detected.

The present invention is comprised of receiving input temperature, output temperature, and HVAC operation data from a communication device that is in wired communication with the input temperature sensor and current probe, and then transmitting the input temperature data from the input temperature sensor, the output temperature data from the output temperature sensor, and the HVAC operation data from the current probe to the communication device. The communication device is capable of wireless communication for further transmitting the received input temperature data, output temperature data, and HVAC operation data. The statistical variance is computed based on historical performance of the HVAC system over time and is further computed by calculating standard deviations in the Delta T value over a period of time. The upper and lower Delta T values are computed from actual Delta T values that are measured over a period of time. As an example, the upper and lower Delta T failure limit values are computed to be +/−six standard deviations from the mean of the measured Delta T values. An alert is automatically generated if the mean of the measured Delta T values violate the statistical based upper and/or lower Delta T limit values.

One benefit of the present invention is that it provides a system for detecting pending HVAC issues before the users of HVAC system notice an issue with cooling and/or heating. One challenge with current HVAC systems is that failures may occur unexpectedly and require immediate attention. Moreover, (based on actual installation data obtained via a system that embodies the present invention) HVAC failures do not occur instantaneously. Rather the HVAC system will run in a degraded response for a period of days and even weeks due to some issue with the system. The present invention solves this problem by monitoring the HVAC system's operation data, and temperature data. It utilizes the measured data to compute Delta T values, and obtain run time values and on/off cycle values to detect when a failure is imminent. This gives the user a head-start in remediating the issue, providing the user with time to contact maintenance personnel and preparing the location for the HVAC system to be off.

Another benefit of the invention is that the statistical based Delta T limit algorithm allows detection of issues earlier than the commonly used "fixed" Delta T limit system. Typically, HVAC technicians consider an HVAC system to be in good operating condition if the measured Delta T is between 10 and 20 degrees F. or even slightly higher when operating in AC mode. The statistical based Delta T limit algorithm in a sense "learns" the behavior of the HVAC system and develops Delta T limits that are typically tighter as compared to the fixed limit system.

Another benefit of the present invention is that it provides for continuous remote monitoring of an HVAC system. Through the use of temperature sensors, a water probe and a current sensor, continuous remote monitoring of the entire system becomes possible. The information is constantly received and maintained by the inventive system for immediate use to execute warnings and alerts, but also as a means of gathering information over time about the HVAC systems functionality.

Another benefit of the present invention is that it is easy to install. The present invention can be used on any central HVAC unit, including currently installed HVAC systems and it requires only a few pieces of hardware to be effective. A trained technician can install the system in under ten minutes and the HVAC can be running while the invention is installed.

Another benefit of the present invention is that provides a cost savings for the user. It saves users money by minimizing repair costs and lowering energy bills. The system is also able to identify and alert the User when the HVAC is running a degraded state.

Another benefit of the present invention is that it allows for the computation of cycle run time and number of ON/OFF events for the HVAC system on a daily basis. Many digital thermostats are installed with default manufacturing setting enabled. These settings in many cases are not the optimal settings for the HVAC system. Short cycle cycling (i.e. too many ON/OFF events) can result when an oversized HVAC unit is installed. Detection and alerting the user to this issue allows the user to adjust the thermostat setting (typically the HVAC dead-band zone) allowing the HVAC to run for a longer period of time at each ON event. Another short cycling event occurs when the AC condensation piping becomes blocked. Many systems have condensate shut off float switch installed that prevent the HVAC from running in this condition. What typically happens is that enough water drains away allowing the float switch to disable. The HVAC system then runs for a few minutes and generates enough water to enable the condensate float switch. This process repeats itself until corrected. The installation of the invention allows the computation of the ON/OFF cycling rate and thereby detects and alerts the user of this failure mode.

Another benefit of the system is that it is applicable to both heat (furnace) and/or cooling (air-conditioning) modes. The software algorithms written are intelligent enough to determine the applicable HVAC mode based on the measured inlet and outlet temperatures and apply the applicable rules to the data. For example, cooling mode can be detected when the outlet temperature is less than the inlet temperature from the heat exchanger. Heating mode can be detected when the outlet temperature is greater than the inlet temperature from the heat exchanger. The algorithms describer in this patent are identical for heating mode and cooling mode although the applicable delta T limits may be different.

Another benefit of the system is the algorithm is able to detect when the system is operating versus when in "FAN ON/SYSTEM OFF" mode. Prototype field units, which were installed under confidentiality, were able to detect the FAN ON mode state by a lower level of blower fan current as compared to HVAC ON state. This allows the delta T data to be omitted from the data set when in FAN ON state.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
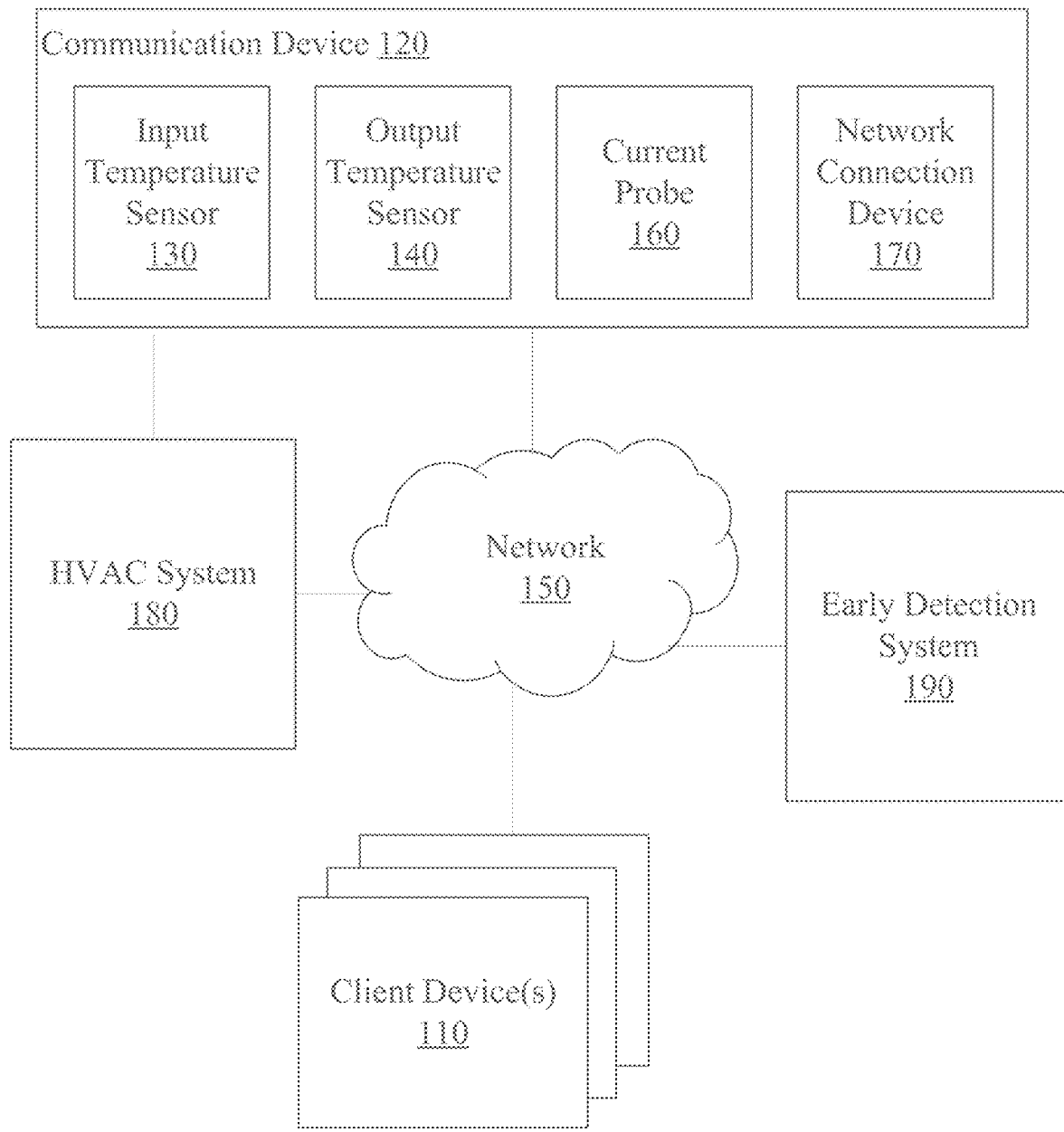
FIG. 1 illustrates various elements of an exemplary continuous monitoring system for early failure detection in HVAC systems according to one embodiment.

The inventive system and method (hereinafter sometimes referred to more simply as "system" or "method") described herein is a continuous monitoring system for early failure detection in HVAC systems. Specifically, the inventive system monitors input and output temperatures, receives HVAC operation data, and computes Delta T values and other values. With the data that is received and computed, the inventive system computes statistical variance and automatically generates alerts which are transferred remotely.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

FIG. 1 illustrates various elements of an exemplary continuous monitoring system for early failure detection in HVAC systems according to one embodiment. The system includes an HVAC system 180, a communication device 120, an early detection system 190, client devices 110, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The HVAC system 180 may be comprised of heating and ventilation system that is installed in a building. A variety of different HVAC systems 180, as would be readily understood by persons of ordinary skill in the art, may be used without departing from the scope of the invention. In one embodiment, the HVAC system 180 may be comprised of a heating component, like a boiler, which is used to generate heat for the building, an air flow component, which is provided by an air handler, and an air conditioning component, which provides cooling and humidity control for a building, whether it be an air conditioner or a system utilizing a chiller to distribute cool water into an air handler.

The communication device 120 communicates with the early detection system 190 via network communication devices. In one embodiment, the communication device 120 receives input data from the various sensor components and transmits the data to the early detection system 190 for further processing. In one embodiment, the communication device 120 may be further comprised of an input temperature sensor 130, output temperature sensor 140, current probe 160, and network connection device 170. The communication device 120 is described in greater detail in FIGS. 2A and 2B. However, in general the communication device 120 receives input and output temperature data from the temperature sensors 130 and 140 and operation data from the current probe 160. The communication device 120 transmits the sensor data by traditional or wireless communication. For example, in accordance with one embodiment of the invention, the communication device 120 may wirelessly communicate with a WiFi router that is installed in a building and in-range of the communication device 120. Other communication devices may be used to initiate communication between the communication device 120 and the network 150, as would be apparent to a person of ordinary skill in the art, without departing from the scope of the invention.

The early detection system 190 receives data from the communication device 120 and computes values from the received data for early detection of HVAC system failure. In one embodiment, the early detection system 190 computes statistical variances on data provided by the communication device 120 and automatically generates alerts when certain thresholds or limits are reached. The specific features of the early detection system 190 are described in greater detail in reference to FIG. 3. But generally, the early detection system 190 computes real-time or near-real-time Delta T values from the received input and output temperature data, and compiles run time values and on/off cycle values from the received HVAC operation data. The early detection system 190 then computes statistical variances based on historically computed Delta T values and computes/determines the upper and lower Delta T limits based on the computed statistical variance in the delta T value. Finally, the early detection system 190 automatically generates an alert if the computed upper or lower Delta T limit is violated by the actual measured data. In one exemplary embodiment of the invention, the early detection system 190 generates an alert if the standard deviation of the measured Delta T data set reaches or exceeds a set standard deviation. In one embodiment of the invention, the early detection system 190 generates an alert if the Delta T value is six standard deviation of the historically detected value. Other standard deviation values, or thresholds may be used without departing from the scope of the invention. As would be understood by a person of ordinary skill in the art, Generally, a smaller standard deviation value, for example five, may detect issues sooner but may result in false failures being reported by the algorithm. In one embodiment of the invention, the early detection system 190 may be implemented in a computing device as described in reference to FIGS. 6-9.

Client device(s) 110 may receive alerts that may be generated by the early detection system 190. The alerts may notify an end user or the person tasked with managing the HVAC system to take early action and repair or service the HVAC system before it fails. The client device(s) 110 may include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each client device 110 may be an electronic device including hardware, software, or embedded logic components or a combination of two or more such components and capable of carrying out the appropriate functions implemented or supported by the client device 110. For example, and without limitation, a client device 110 may be a desktop computer system, a notebook computer system, a netbook computer system, a handheld electronic device, or a mobile telephone. The present disclosure contemplates any user device 110. A client device 110 may enable a network user at the client device 110 to access network 110. A client device 110 may enable its user to communicate with other users at other client devices 110.

A client device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A client device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the client device 110 one or more Hyper Text Markup Language (HTML) files responsive to the HTTP request. The client device 110 may render a web page based on the HTML files from server for presentation to the user. The present disclosure contemplates any suitable web page files. As an example, and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The client device 110 may also include an application that is loaded onto the client device 110. The client device 110 obtains data from the network 150 and displays it to the user within the client device 110 interface.

Exemplary client devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
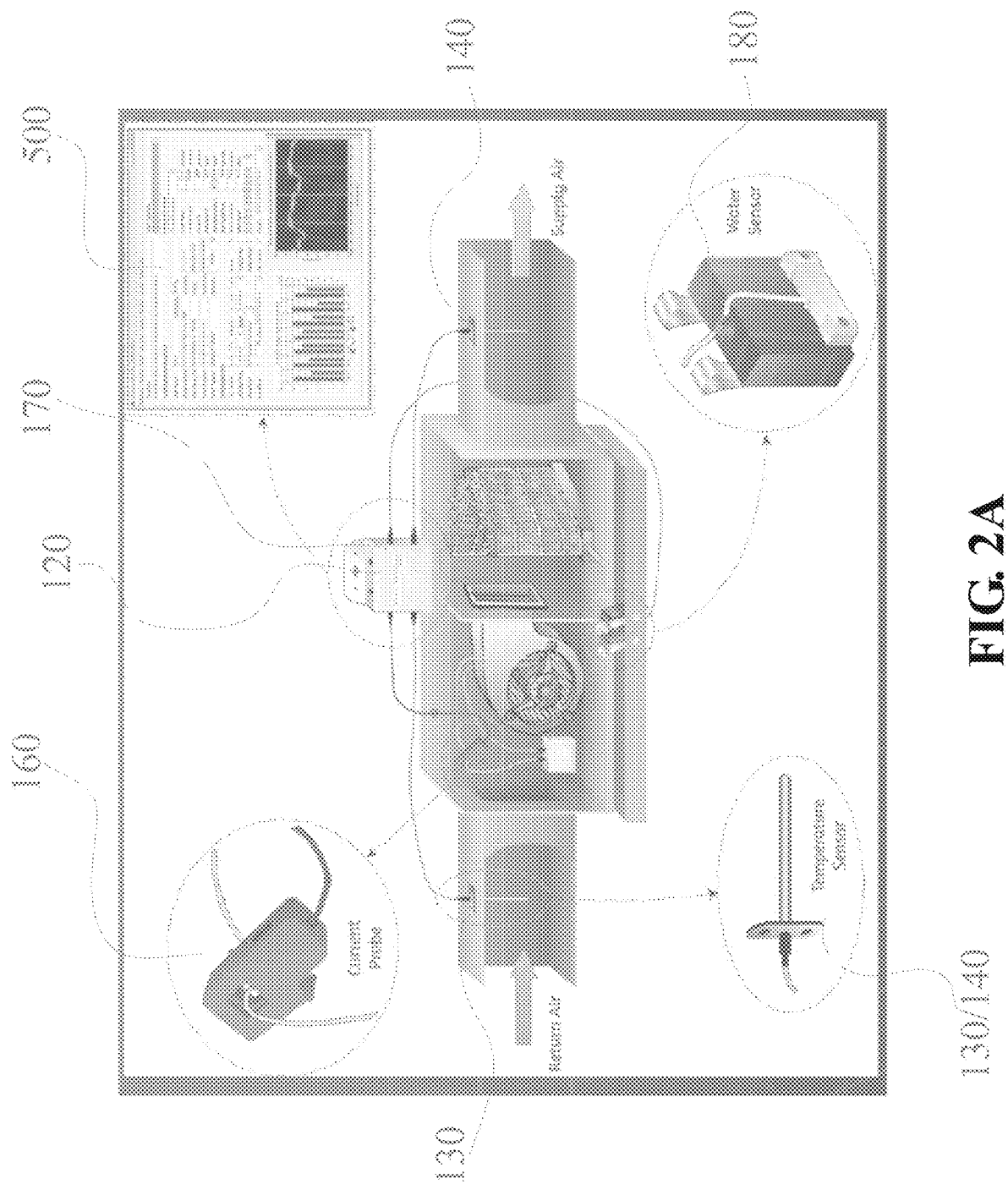
FIG. 2A illustrates the continuous monitoring system as well as connected sensors in accordance with an embodiment of the invention.

FIG. 2A illustrates, in accordance with one exemplary embodiment, the components and placement of various sensors and devices that comprise the communication device 120. As noted above, the communication device 120 receives various HVAC operation data and transmits it over a network 150 to an early detection system 190. As illustrated, the communication device 120 may be comprised of an input temperature sensor 130, an output temperature sensor 140, a current probe 160 and a network connection device 170. The communication device may also include a water sensor 180 to detect when the AC condensing drain line is blocked and the AC drain pan begins to fill with water (in the absence of a condensate shut off float switch).

Figure 2B:
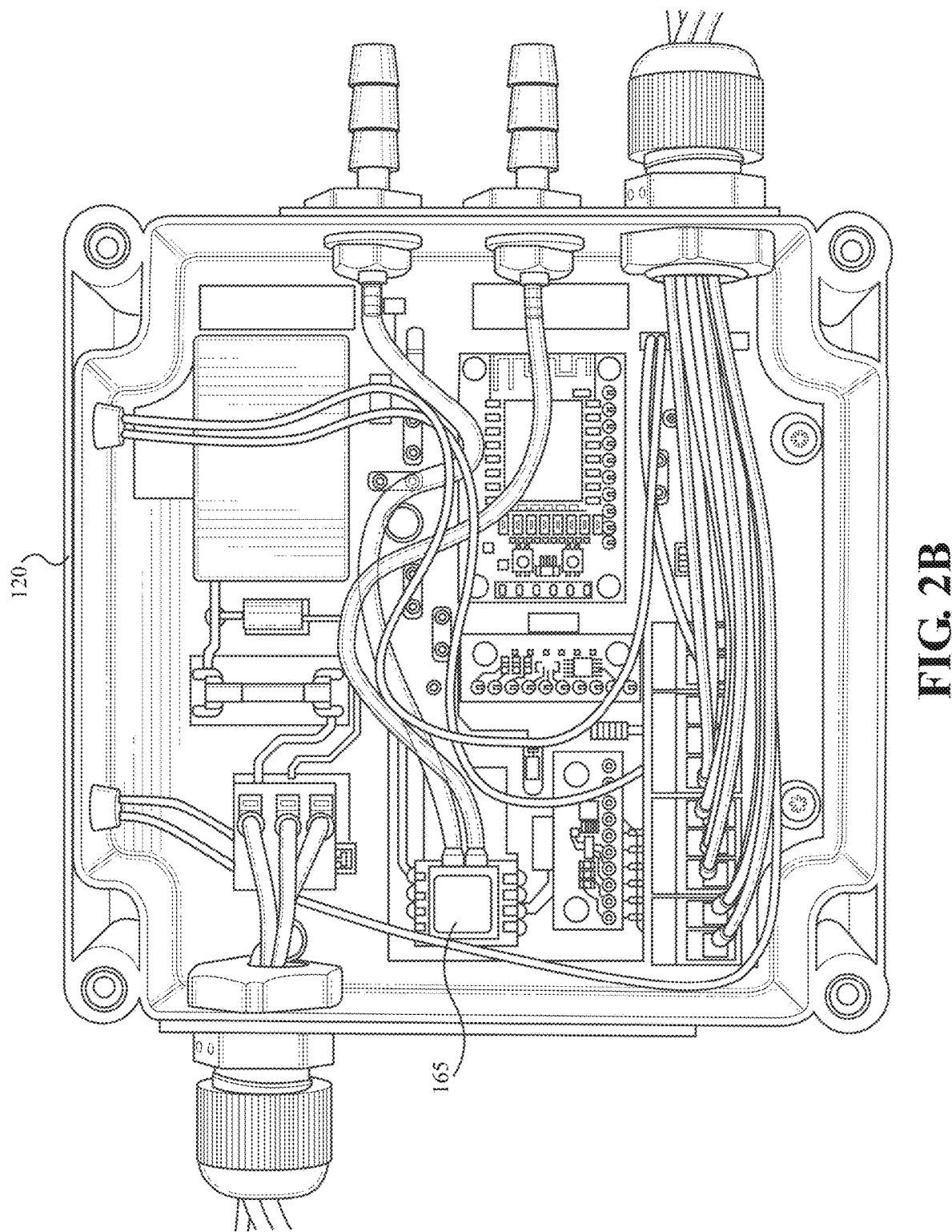
FIG. 2B illustrates a communication device in accordance with an embodiment of the invention.

FIG. 2B illustrates the various elements of communication system 120 in accordance with an exemplary embodiment of the invention. It may include other sensors such as delta P sensors 165 for measuring the pressure drop across the HVAC filter to determine when to clean or replace the furnace filter based on measured parameters rather than a time based schedule or other as would be readily understood by a person of ordinary skill in the art, without departing from the scope of the invention. Generally, as illustrated in FIG. 2B, the pressure sensor 165 may connect to pressure ports (via tubing) that may be installed before and after a furnace filter for measure the pressure drop across the filter. In accordance with one embodiment of the invention, a delta P measurement may be taken by the delta P sensors when the HVAC unit is running, and continuously or semi-continuously measured during an analysis period. The delta P values may be transmitted to the early detection system 190, which may monitor the incoming values. When the delta P value is detected to be above or below a pre-defined threshold, the early detection system may generate a fault alert suggesting that the filer is dirty and should be replaced. If the delta P measurement is near zero when the unit is running (as determined by the current probe 160) then an alert may be generates alerting the relevant users that a filer is missing, damaged, or likely to be damaged by, for example, buckling. In one embodiment the delta P threshold may be calculated based on the delta P value that is calculated when a clean filter is installed (calibration value). In one embodiment, a 25% increase or decrease from the calibration value may be set as a threshold. The 25% value is exemplary, however, as would be readily apparent to a person of ordinary skill in the art, other values may be used without departing from the scope of the invention.

Referring again to FIG. 2A, the input temperature sensor 130 measures air temperature in the return air plenum. In one embodiment, and as illustrated in FIG. 2A, the input temperature sensor 130 may be placed within a portion of the return air plenum. It may transmit the detected temperature information to the communication device 120. The input temperature sensor 130 may be in wired or wireless communication with the communication device 120 and may transmit temperature data to the communication device 120 periodically or continuously. A variety of different temperature sensors may be used, as would be understood by a person of ordinary skill in the art, without departing from the scope of the invention. Moreover, although only one input temperature sensor 130 is illustrated, a number of sensors, which may be placed at a variety of different locations, may be used without departing from the scope of the invention.

The output temperature sensor 140 measures air temperature in the supply air plenum of the HVAC system. In one embodiment, the output temperature sensor 140 may be placed within a portion of the return air plenum and may transmit the sensed temperature information to the communication device 120. The output temperature sensor 140 may be in wired or wireless communication with the communication device 120 and may transmit temperature data to the communication device 120 periodically or continuously. In one embodiment, the output temperature sensor may be placed anywhere supply air is delivered by the HVAC system. However, placement in the supply air plenum is found to be advantageous for improved analysis as described below. A variety of different temperature sensors may be used, as would be understood by a person of ordinary skill in the art, without departing from the scope of the invention. Moreover, although only one input temperature sensor 130 is illustrated, a number of sensors, which may be placed at a variety of different locations, may be used without departing from the scope of the invention.

The current probe 160 measures current that may be flowing through one or more portions of the HVAC system at any given time. In one embodiment of the invention, the current probe 160 detects ON/OFF events for the HVAC system. In one embodiment, an ON event may be detected when current is present; an OFF event may be detected when no current is detected or when statistically insignificant current is detected. When detected, the information may be transmitted to the communication device 120 automatically and/or periodically. The current probe 160 may also measure variances in the current, such as, to determine whether the HVAC system is running in different modes of operation, including, for example, but not limited to "FAN ON/SYSTEM OFF" mode. For example, a lower level of blower fan current, as compared to HVAC ON state, may be measured by the current probe 160, and may be used to detect an "FAN ON/SYSTEM OFF" mode (which, as described in more detail below, indicates to the early detection system 190 that Delta T values associated with such a state of operation may be ignored for downstream computation).

Figure 3:
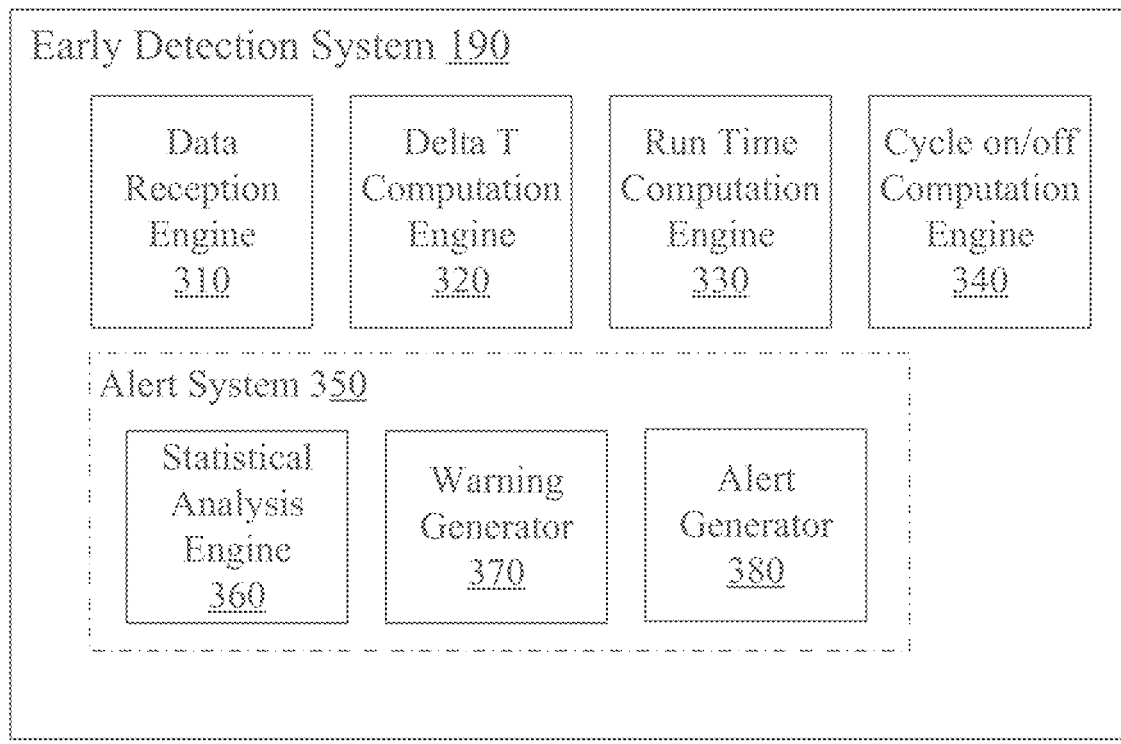
FIG. 3 illustrates the early detection system of the presently disclosed continuous monitoring system for early failure detection in HVAC systems according to one embodiment.

FIG. 3 illustrates the early detection system 190, which detects early degradation and/or failure of an HVAC system. In one embodiment of the invention, the early detection system 190 receives data from the communication device 120 and applies computational analysis to identify impending issues and generate alerts if appropriate. In one embodiment, the early detection system 190 may be comprised of a data reception engine 310, a Delta T computation engine 320, a run time computation engine 330, and a cycle on/off computation engine 340.

The data reception engine 310 receives HVAC performance data from the communication device 120. In one embodiment, the data reception engine 310 may receive input temperature, output temperature, current information, water detection information, etc. from the various sensors and output modules on the HVAC system. The received data may be provided to various modules and engines described herein for further computation and analysis.

The Delta T computation engine 320 computes the Delta T values from at least some of the data that is received by the data reception engine 310. The specific method of computing a Delta T value may be known to persons of ordinary skill in the art, but the system and methods described herein permit real-time or near-real-time and/or continuous Delta T computation. Specifically, the Delta T computation engine 320 periodically and/or continuously processes received data to compute the Delta T performance of a system from a historical and/or statistical standpoint. This historical Delta T data may be provided to the statistical analysis engine 360 for a further computation. For example, as described in greater detail below, the statistical analysis engine 360 may calculate upper and lower Delta T values based on historical data over a period of time. In one embodiment, the Delta T computation engine 320 incorporates a filter time on startup and shut down to allow the HVAC to reach a certain level of steady-state behavior before computing a Delta T value. However, as described above, placing the input sensor 130 and output sensor 140 close to the HVAC system 180 minimizes the necessity for the filter time and a lower value may be used in the system and methods described herein.

The run time computation engine 330 computes the run time from the data received by the data reception engine 310. In one embodiment, the run time computation engine 330 computes run time based on current data that is measured by the current probe 160. For example, a period between when current is detected and then subsequently cut-off may be identified as a single run time within an analysis period by the run time computation engine 330. The computation may be performed on data that is periodically or continuously received throughout an analysis period. This essentially keeps track of how long an HVAC system has been running during the selected time period. The analysis period may be minutes, hours, days or weeks, or another period of time as would be readily apparent to one skilled in the art.

The cycle on/off computation engine 340 computes the number of times the HVAC system cycles on/off cycle within an analysis period. In one embodiment of the invention, the cycle on/off numbers may be calculated based on the number of detected run times in a given analysis period. In one embodiment, the computation is performed on data that is periodically or continuously received throughout an analysis period. This value calculated is essentially the percentage of the time the system has been running during an analysis time period. The analysis period may be minutes, hours, days or weeks, or another period of time as would be readily apparent to one skilled in the art. The specifics may vary per unit, however, numerous ON/OFF cycles suggest that cycle run time is low. A unit that is short cycling (not running for a long time) generally tends to be in the 1-3 minute range (however, the details may vary based on the size of the unit and the size of the house). As described above, this generally suggests that the unit is too big or there is something else that is wrong. If cycle ON/OFF time is determined to be too numerous, based on a threshold value, and/or cycle run time is low, based on a threshold value, then a warning or an alert may be generated.

The early detection system 190 is further comprised of an alert system 350. The alert system 350 generates an alert if the computed statistically based upper and/or lower Delta T limit is detected to have anomalous values. In one embodiment of the invention, the alert system 350 is comprised of a statistical analysis engine 360, a warning generator 370 and an alert generator 380.

The statistical analysis engine 360 computes the statistical variance in the computed Delta T value. The statistical variance is computed based on historical performance of the HVAC system over a period of time. It is computed by calculating standard deviations in the Delta T value over a period of time. The statistical analysis engine 360 then computes upper and lower Delta T limits based on the computed statistical variance in the Delta T value. In one embodiment of the invention, the upper and lower Delta T limits may be set at approximately 6 standard deviations from the mean to prevent false alerts. When the measured Delta T value exceeds the upper or lower Delta T limits, a notice is sent to the Warning Generator 370 for further processing. Generally, the presence of outlier Delta T values has a strong effect on the mean and standard deviation used in normal statistical algorithms. The use of the Mean Absolute Deviation from the Median Statistical algorithm minimizes the influence of outlier data points when computing the statistical based upper and lower Delta T values, and may be used, in accordance with an embodiment of the invention without departing from the scope of the invention.

The warning generator 370 generates a warning that may be sent to a user device 110 over a network. In one exemplary embodiment of the present invention, the warning generator 370 obtains information from the statistical analysis engine 360 when a Delta T limit is reached. The warning generator 370 also factors in information from the run time computation engine 330 and the cycle on/off computation engine 340. Based on the values and information obtained from the statistical analysis engine 360, run time computation engine 330, and cycle on/off computation engine 340, the system will make a calculation based on an algorithm to determine if an early warning alert should be sent to the alert generator 380. In another exemplary embodiment of the present invention, the warning generator 370 will generate a warning if the Delta T variation is more than six standard deviations from the mean.

The alert generator 380 will send an alert once the warning generator 370 generates a warning. An alert can be sent to a user device 110 that is associated the HVAC system. As describe above, the user device 110 may be monitored by maintenance personnel, a monitoring system, and/or a homeowner. In one embodiment of the present invention, the alert generator 380 automatically generates an alert if the Delta T value is approximately six (6) standard deviations from the mean.

In one embodiment of the invention, the warning generator 370 and/or the alert generator 380 may generate a warning and/or an alert if Delta T exceeds a max limit, Delta T is below a minimum limit, the unit running too much (cycle run time is too high), unit running too little (cycle run time is too low, statistical based upper or lower Delta T limit is violated, network connection issues, input and/or output temperature sensor is non-functional and/or providing unreliable reading, cycle ON/OFF limit is exceeded, water is detected by water sensor, and/or Delta P across the furnace filter exceeded.

Figure 4:
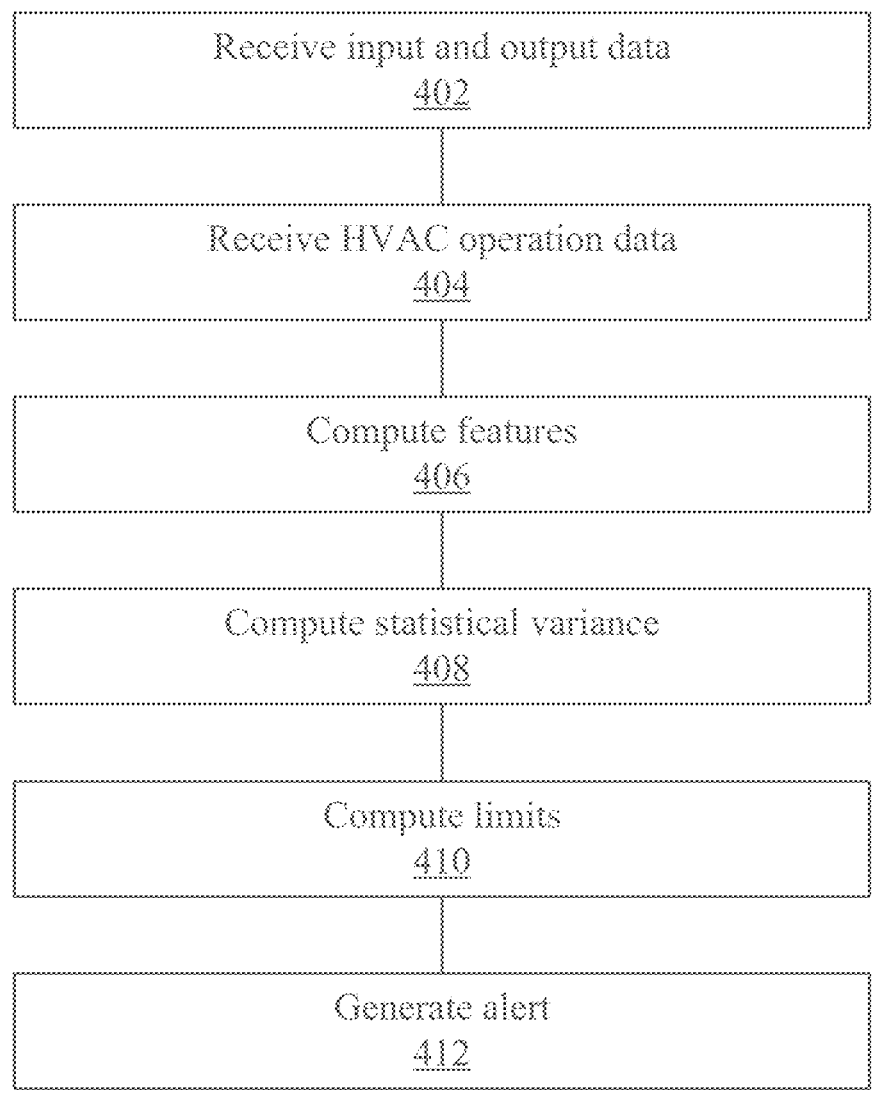
FIG. 4 illustrates a flowchart of an exemplary process for generating alerts for a continuous monitoring system for early failure detection in HVAC systems according to one embodiment.

FIG. 4 illustrates a flowchart of an exemplary process for generating alerts for a continuous monitoring system for early failure detection in HVAC systems according to one embodiment. The process is comprised of receiving input and output temperature data 402, receiving HVAC operator data 404, such as run time values and cycle on/off values, computing features 406 by determining whether to consider or disregard the temperature data for the purposes of calculating a Delta T value, computing statistical variance 408 in the calculated Delta T values, computing Delta T limits 410, and generating an alert 412 if a Delta T limit is reached.

In accordance with an embodiment of the invention, the input temperature data and output temperature data may be received 402 from temperature sensors that may be place at or near the return air plenum and the supply air plenum respectively. The input temperature data provides the temperature of the air that is fed into the HVAC system, and the output air temperature provides the temperature of the air that is output by the HVAC system.

The HVAC operation data 404 refers to other information that may be received from various elements of the communication device 102, and may include, for example, run time information, cycle on/off time information, water sensor data, which indicates whether a AC condensing drain line is blocked and AC drain pan in waterlogged, Delta P information, which measures the pressure drop across a HVAC filter, etc. In one embodiment of the invention, the input temperature data, output temperature data, and HVAC operation data may be received from a communication device 120. In one embodiment, the input temperature data, output temperature data, and HVAC operation data may be received from one or more sensors that are placed at or near the HVAC system.

In one embodiment of the invention, the input temperature data, output temperature data, and HVAC operation data may be used to compute features 406. Computing features 406 may be comprised of identifying whether to calculate a Delta T value. As described in greater detail above, Delta T value may not be computed when the HVAC system is in "FAN ON/SYSTEM OFF" mode, as determined by the compute features step 406 based on received HVAC operation data 404. Similarly, Delta T values may not be computed until the HVAC system has reached a certain level of steady-state, as determined by the compute features 406 step based on HVAC operation data. In one embodiment, the compute features step 406 is further comprised of calculating Delta T values for the HVAC system based on input temperature data, output temperature data, and HVAC operation data. The Delta T value may be computed continuously and/or periodically over an analysis period. Although the Delta T value is described herein, other similar analysis may be performed at the compute features step 406, as would be readily apparent to a person of ordinary skill in the art, without departing from the scope At step 408, the process computes statistical variance 408 in the Delta T values and/or other features that are computed at step 406. In one embodiment, the process computes 408 the Median Absolute Deviation from the Median Algorithm. Other statistical analysis may be computed, as would be readily understood by a person of ordinary skill in the art, without departing from the scope of the invention.

At step 410, limits or thresholds in the computed features may be computed. The limits indicate when an HVAC system is running in a suboptimal condition and/or likely to experience failure. In one embodiment of the invention, at step 410 upper and lower delta T statistical limits are computed using the Median Absolute Deviation from the Median Algorithm. In some embodiments, the Delta T limits may be set at six standard deviations from the mean that is computed from historical and real-time or near-real-time Delta T data. However, other standard deviation values may be used without departing from the scope of the invention. Moreover, other methods of computing limits may be used, as would be apparent to a person of ordinary skill in the art, without departing from the scope of the invention.

At step 412 an alert may be generated if a limit is reached. As described throughout the specification, in one embodiment, an alert may be generated 412 when an HVAC's Delta T value reaches upper or lower statistical limits as computed using Median Absolute Deviation from the Median Algorithm. In one embodiment of the invention, an alert may be generated 412 when the Delta T value reaches six standard deviations from the mean based on historically computed Delta T values over an analysis period.

Figure 5A:
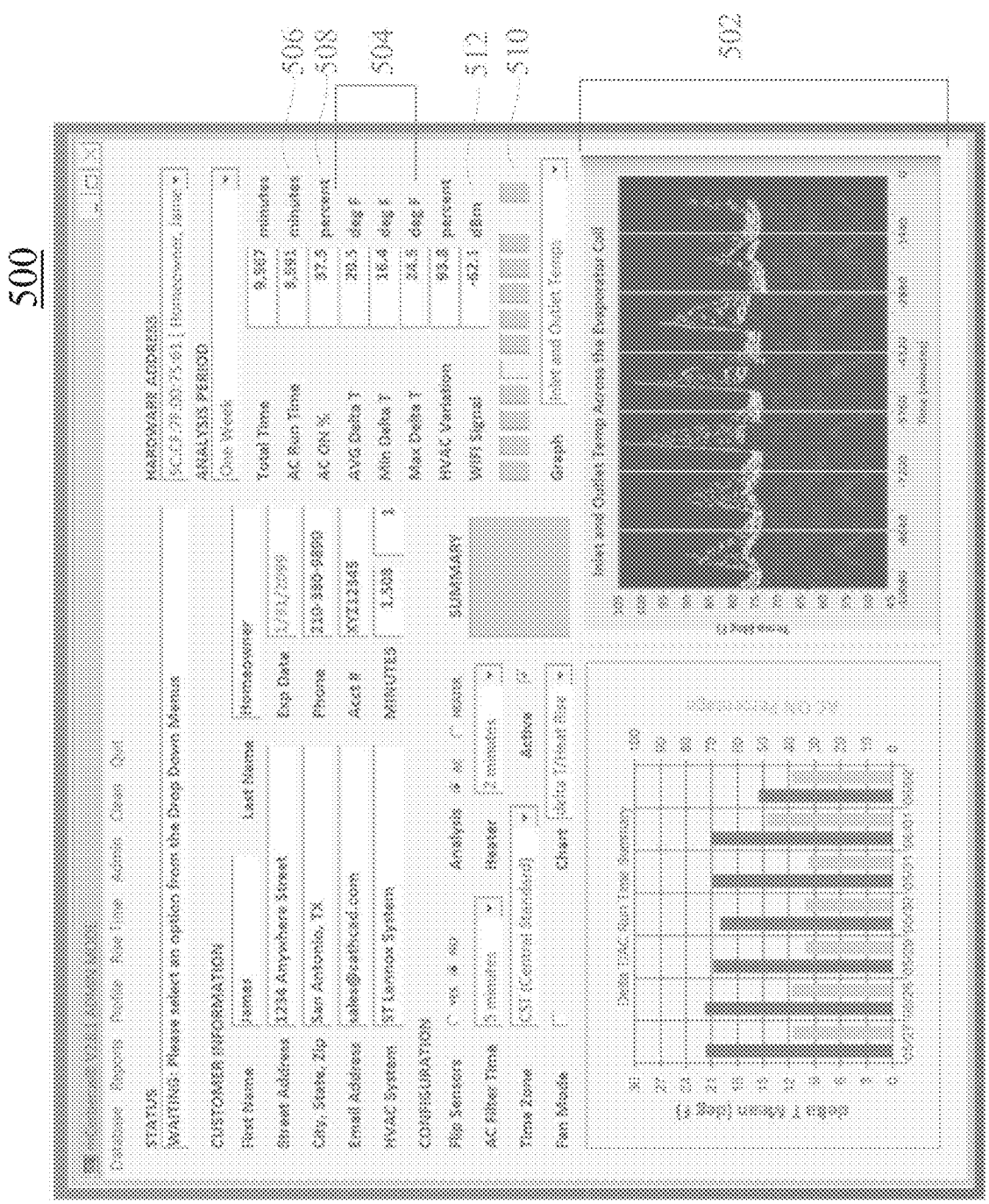
FIG. 5A illustrates one instance of the user/operator interface for a continuous monitoring system for early failure detection in HVAC systems according to one embodiment.

FIG. 5A illustrates one embodiment of the graphical user interface 500 of the early failure detection that is described herein. In the exemplary embodiment, the graphical user interface may provide the following data, including, but not limited to: temperature input and output data 502, Delta T values 504, and other operating data such as the run time 506. In one embodiment, the AC Run Time select box 506 corresponds to the run time computation engine 330, and the AC ON % select box 508 correspond to the cycle on/off computation engine 340.

The warning and/or alert indicator 510 is illustrated in FIG. 5A. The warning and/or alert indicator 510 may generate a warning and/or an alert if Delta T 504 exceeds a max limit, Delta T 504 is below a minimum limit, the unit running too much (cycle run time is too high) 506, 508, unit running too little (cycle run time is too low) 506, 508, statistical based upper or lower Delta T limit 504 is violated, network connection issues are identified 512, input and/or output temperature sensor is non-functional and/or providing unreliable reading 502, cycle ON/OFF limit is exceeded, water is detected by water sensor, and/or Delta P across the furnace filter exceeded.

Figure 5B:
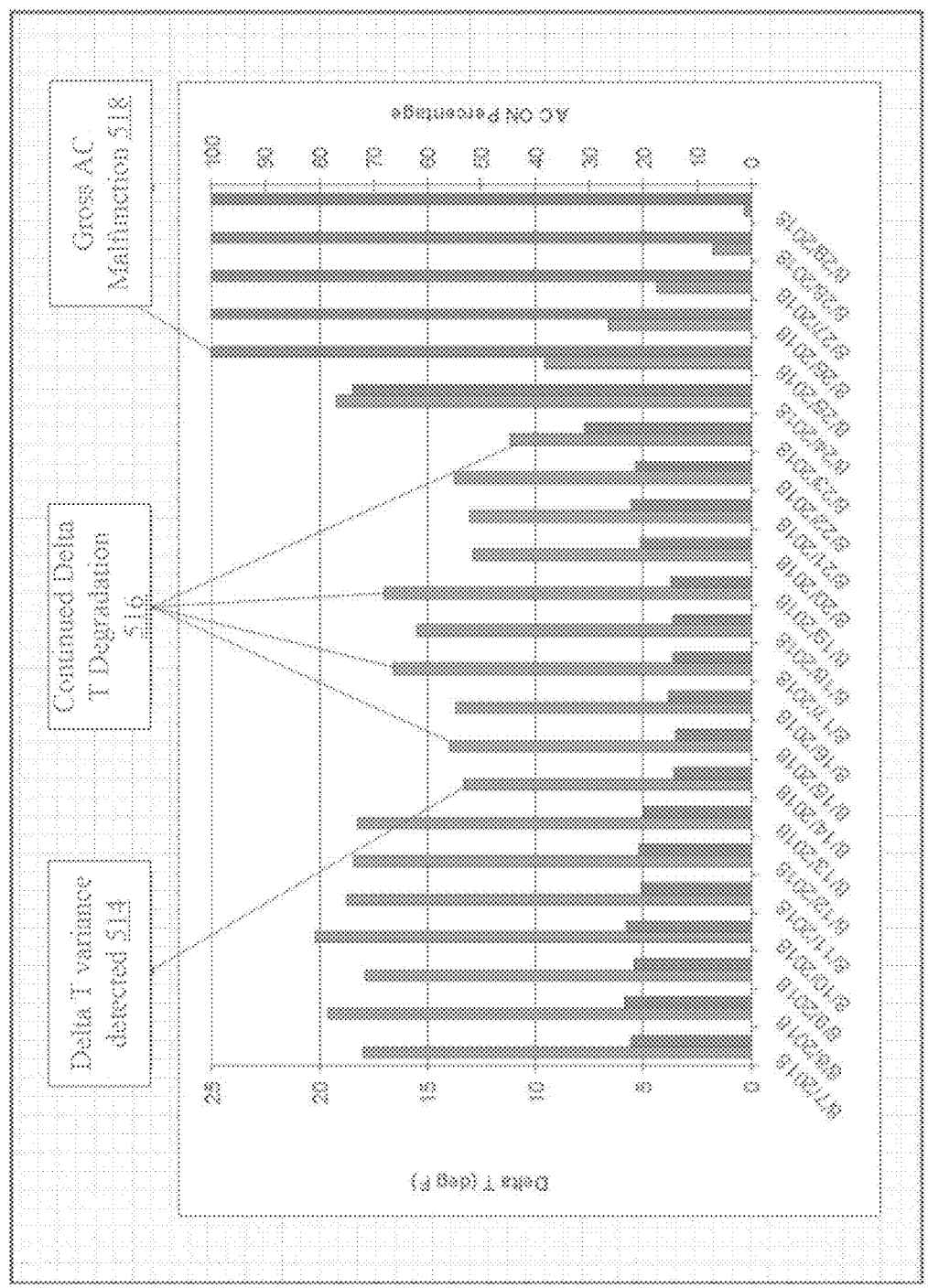
FIG. 5B illustrates the inventive system as deployed in an operational field environment in accordance with an embodiment of the invention.

FIG. 5B illustrate an exemplary inventive system in an operational field environment. As illustrated in FIG. 5B, the inventive system identified gross failure 12 days prior to the actual failure date. As illustrated, the X-axis illustrates dates, and Y-axis illustrates Delta T temperatures. During a first phase normal Delta T performance is detected. In phase two 514 statistically significant degraded Delta T performance is identified. Degraded Delta T performance continues in phase three 516 for twelve days prior to gross malfunction. The gross malfunction event is illustrated in phase four 518 as having a 100% (always on) percentage. As shown, the inventive system that is described herein is effective at identifying failure prior to the actual occurrence of failure.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
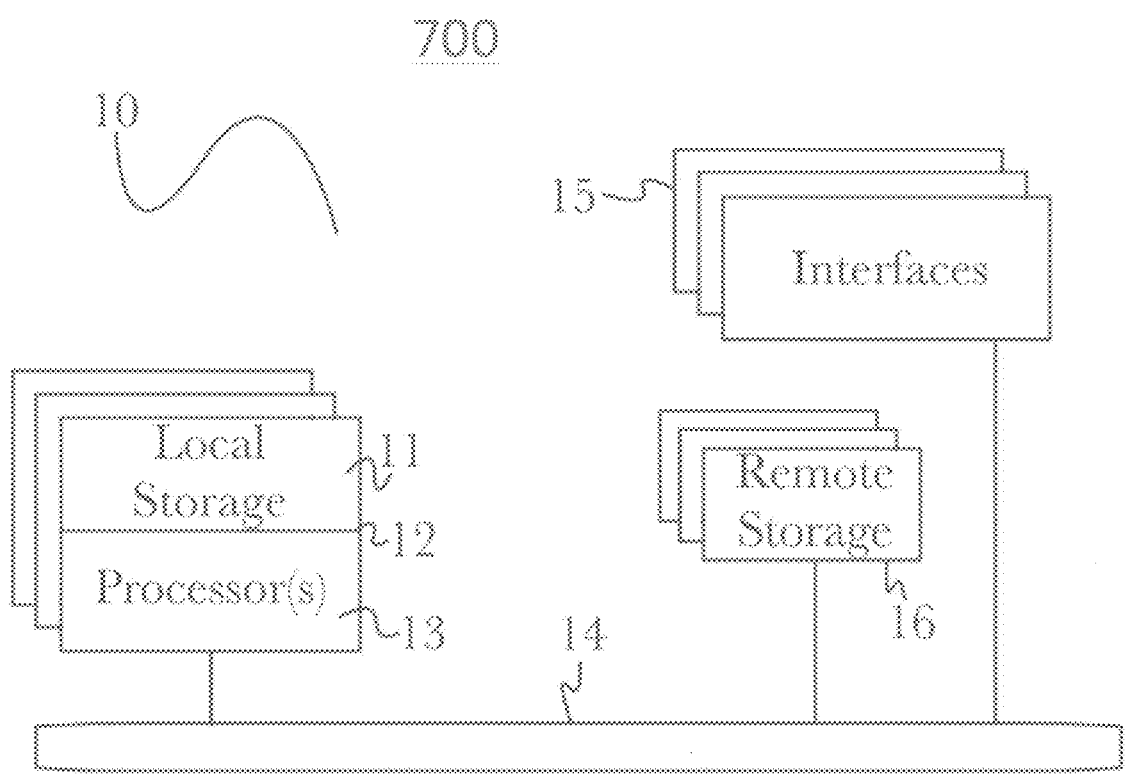
FIG. 6 illustrates one embodiment of components of an example machine able to read instructions from a machine-readable medium and execute them in a processor (or controller).

Referring now to FIG. 6, there is shown a block diagram depicting an exemplary computing device 700 suitable for implementing at least a portion of the features or functionalities disclosed herein. Computing device 700 may be, for example, any one of the computing machines listed in the previous paragraph, or indeed any other electronic device capable of executing software- or hardware-based instructions according to one or more programs stored in memory. Computing device 700 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 700 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
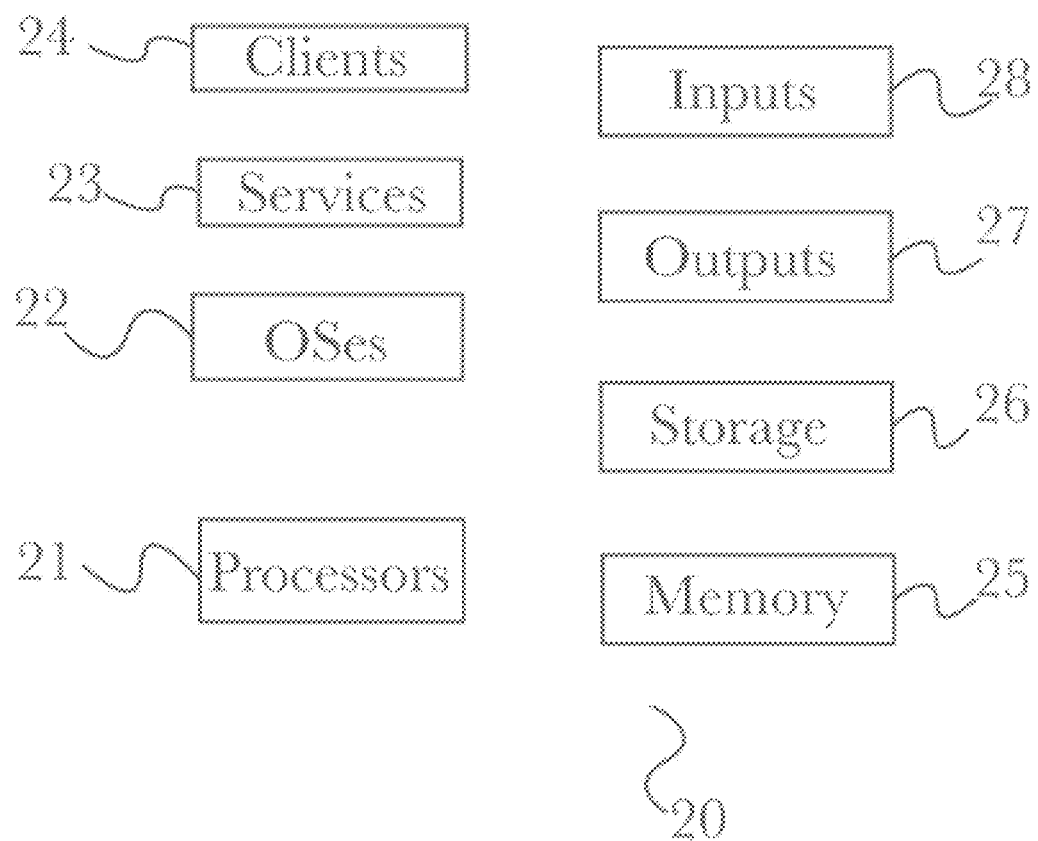
FIG. 7 illustrates on embodiment of the computing architecture that supports an embodiment of the inventive disclosure.

In some embodiments, systems may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 8:
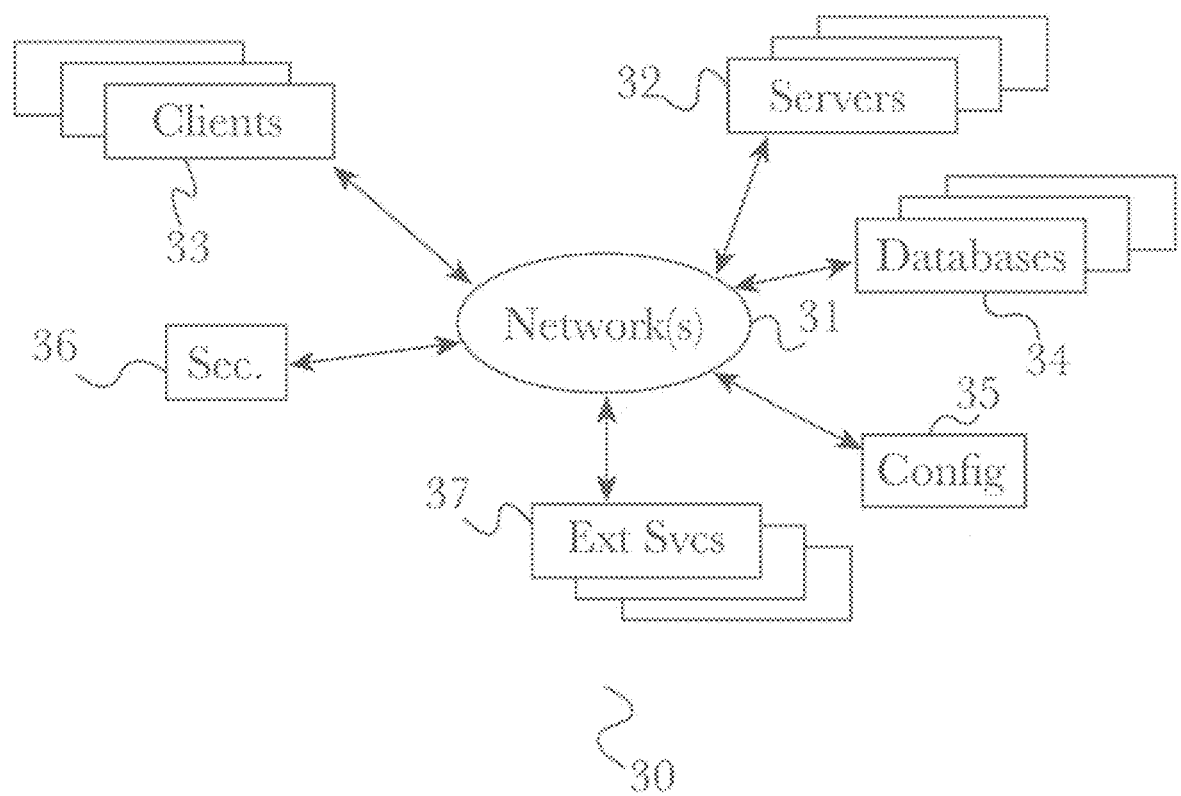
FIG. 8 illustrates components of a computing device that supports an embodiment of the inventive disclosure.

In some embodiments, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 700 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 9:
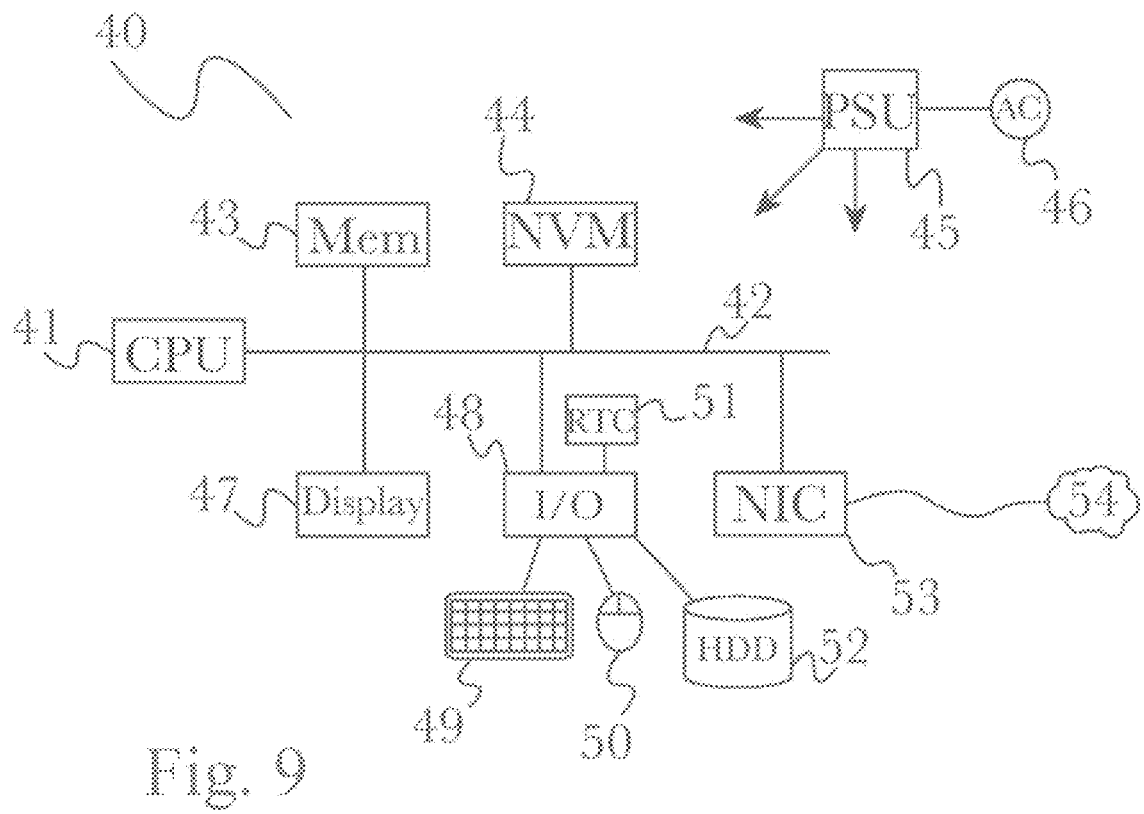
FIG. 9 illustrates components of a computing device that supports an embodiment of the inventive disclosure.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

I claim:

1. A computer program product for monitoring an HVAC system, comprising a non-transitory computer readable storage medium having instructions encoded thereon that, when executed by a processor, cause the processor to perform a set of operations, the set of operations comprising:
receiving input temperature data and output temperature data that correspond to an analysis period of the HVAC system;
computing at least one delta T value by determining a difference between an input temperature of the input temperature data and an output temperature of the output temperature data;
computing an upper delta T limit and a lower delta T limit based on a median absolute deviation from a median (MAD) of a plurality of delta T values;
comparing a newly calculated delta T value to the upper delta T limit and the lower delta T limit; and
generating an alert, a warning, or both the alert and the warning if the newly calculated delta T value is either greater than the upper delta T limit or less than the lower delta T limit,
wherein the alert and/or the warning is to notify an individual about a problem of the HVAC system to facilitate repair of the HVAC system before the HVAC system fails.

2. The computer program product of claim 1, wherein the input temperature data and the output temperature data are provided by a communication device operably connected to an input temperature sensor positioned at a return air plenum of the HVAC system and an output temperature sensor positioned at a supply air plenum of the HVAC system.

3. The computer program product of claim 2, wherein the input temperature data and the output temperature data are transmitted to the communication device.

4. The computer program product of claim 2, wherein the communication device is capable of wireless communication for transmitting the input temperature data and the output temperature data.

5. The computer program product of claim 1, wherein the plurality of delta T values comprises historical delta T values representative of performance of the HVAC system over a period of time.

6. The computer program product of claim 1, wherein the computer program product automatically distinguishes a heating mode from a cooling mode, and independently provides an analysis that is specific for each mode.

7. A computer program product for monitoring an HVAC system, comprising a non-transitory computer readable storage medium having instructions encoded thereon that, when executed by a processor, cause the processor to perform a set of operations, the set of operations comprising:
receiving input temperature data, output temperature data, current probe data, water sensor data, and pressure sensor data that correspond to an analysis period;
determining a presence or an absence of water based on the water sensor data;
computing at least one delta T value by determining a difference between an input temperature of the input temperature data and an output temperature of the output temperature data;
computing at least one run time value from the current probe data;
computing at least one on/off cycle value from the current probe data;
computing at least one delta P value by determining a difference between an input pressure of the pressure sensor data and an output pressure of the pressure sensor data;
computing an upper delta T limit and a lower delta T limit based on a median absolute deviation from a median (MAD) of a plurality of delta T values and comparing a newly calculated delta T value to the upper delta T limit and the lower delta T limit;
computing at least one run time value threshold based on a plurality of run time values and comparing a newly calculated run time value to the run time value threshold;
computing at least one on/off cycle value threshold based on a plurality of on/off cycle values and comparing a newly calculated on/off cycle value to the on/off cycle value threshold;
computing at least one delta P value threshold based on a plurality of delta P values and comparing a newly calculated delta P value to the delta P value threshold; and
generating an alert, a warning, or both the alert and the warning if:
the presence of water is determined based on the water sensor data;
the newly calculated delta T value is outside a range of the upper delta T limit and the lower delta T limit;
the newly calculated run time value is outside a range of the run time value threshold;
the newly calculated on/off cycle value is outside a range of the on/off cycle value threshold;
the newly calculated delta P value is outside a range of the delta P value threshold; or
any combination thereof,
wherein the alert and/or the warning is to notify an individual about a problem of the HVAC system to facilitate repair of the HVAC system before the HVAC system fails.

8. A computer program product for monitoring an HVAC system, comprising a non-transitory computer readable storage medium having instructions encoded thereon that, when executed by a processor, cause the processor to perform a set of operations, the set of operations consisting essentially of:
receiving input temperature data and output temperature data that correspond to an analysis period of the HVAC system;
computing at least one delta T value by determining a difference between an input temperature of the input temperature data and an output temperature of the output temperature data;
computing an upper delta T limit and a lower delta T limit based on a median absolute deviation from a median (MAD) of a plurality of delta T values;

comparing a newly calculated delta T value to the upper delta T limit and the lower delta T limit; and generating an alert, a warning, or both the alert and the warning if the newly calculated delta T value is either greater than the upper delta T limit or less than the lower delta T limit, wherein the alert and/or the warning is to notify an individual about a problem of the HVAC system to facilitate repair of the HVAC system before the HVAC system fails.

9. The computer program product of claim 8, wherein the input temperature data and the output temperature data are provided by a communication device operably connected to an input temperature sensor positioned at a return air plenum of the HVAC system and an output temperature sensor positioned at a supply air plenum of the HVAC system.

10. The computer program product of claim 9, wherein the input temperature data and the output temperature data are transmitted to the communication device.

11. The computer program product of claim 9, wherein the communication device is capable of wireless communication for transmitting the input temperature data and the output temperature data.

12. The computer program product of claim 8, wherein the plurality of delta T values comprises historical delta T values representative of performance of the HVAC system over a period of time.

13. The computer program product of claim 8, wherein the computer program product automatically distinguishes a heating mode from a cooling mode, and independently provides an analysis that is specific for each mode.

* * * * *